(12) United States Patent
Zimmermann et al.

(10) Patent No.: US 10,071,453 B2
(45) Date of Patent: Sep. 11, 2018

(54) NUMERICALLY CONTROLLED MACHINE TOOL

(71) Applicants: DMG MORI AKTIENGESELLSCHAFT, Bielefeld (DE); DMG MORI CO., LTD., Yamatokoriyama-shi, Nara (JP)

(72) Inventors: Anton Zimmermann, Grän (AT); Roland Köchl, Vils (AT)

(73) Assignees: DMG MORI AKTIENGESELLSCHAFT, Bielefeld (DE); DMG MORI CO., LTD., Yamatokoriyama-shi (JP)

( * ) Notice: Subject to any disclaimer, the term of this patent is extended or adjusted under 35 U.S.C. 154(b) by 0 days.

(21) Appl. No.: 15/021,898

(22) PCT Filed: Sep. 11, 2014

(86) PCT No.: PCT/EP2014/069403
§ 371 (c)(1),
(2) Date: Mar. 14, 2016

(87) PCT Pub. No.: WO2015/036488
PCT Pub. Date: Mar. 19, 2015

(65) Prior Publication Data
US 2016/0229014 A1    Aug. 11, 2016

(30) Foreign Application Priority Data

Sep. 13, 2013 (EP) ..................................... 13184339

(51) Int. Cl.
*B23Q 11/00* (2006.01)
*B23Q 11/08* (2006.01)
*F16M 5/00* (2006.01)

(52) U.S. Cl.
CPC .......... *B23Q 11/0003* (2013.01); *B23Q 11/08* (2013.01); *F16M 5/00* (2013.01)

(58) Field of Classification Search
CPC ......... B23Q 11/003; B23Q 11/08; F16M 5/00
(Continued)

(56) References Cited

U.S. PATENT DOCUMENTS 3,773,140 A * 11/1973 Mahajan ................ G10K 11/16
                                                            181/200
4,700,517 A * 10/1987 Stohr .................. B23Q 11/0891
                                                            52/126.4

(Continued)

FOREIGN PATENT DOCUMENTS

EP   1 413 393 A2   4/2004
EP   1 719 573 A1   11/2006
(Continued)

OTHER PUBLICATIONS

Oct. 20, 2014 Search Report issued in International Patent Application No. PCT/EP2014/069403.

*Primary Examiner* — Tan Le
(74) *Attorney, Agent, or Firm* — Oliff PLC

(57) ABSTRACT

A numerically controlled machine tool, including a machine bed, a cabin having a cabin wall which embraces at least part of the machine bed, and at least one shaped element, which has a substantially panel-shaped basic form and is attached to the machine tool in such a way that a cavity is present between the shaped element and the cabin wall and/or the machine bed.

14 Claims, 4 Drawing Sheets

Figure 1:
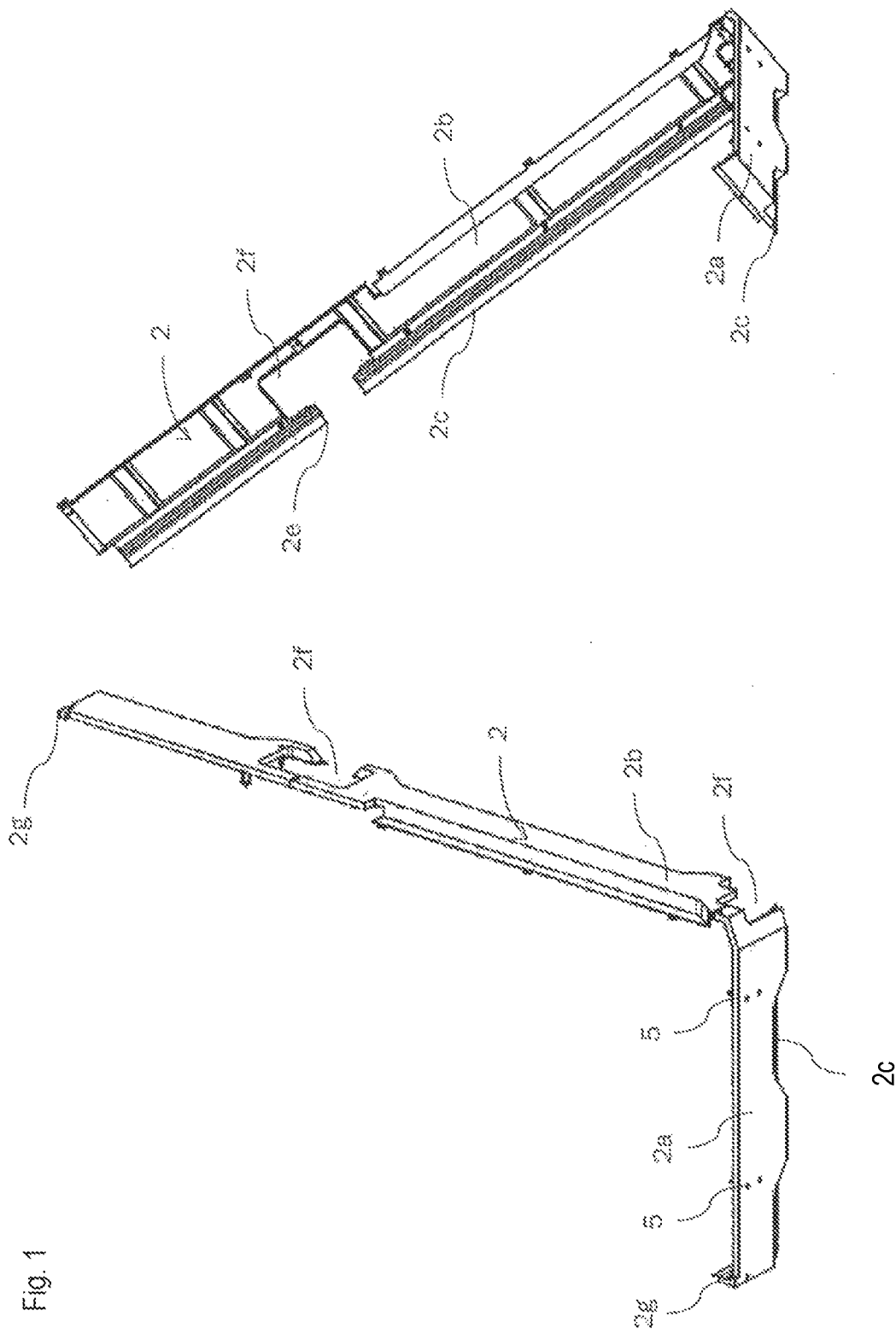

(58) Field of Classification Search
USPC ....... 248/672, 673, 678; 52/241, 242, 238.1, 52/97, 471
See application file for complete search history.

(56) References Cited

U.S. PATENT DOCUMENTS

| | | | |
|---|---|---|---|
| 6,609,687 B1 * | 8/2003 | Leski | ........................ G07F 9/10 248/188.2 |
| 2006/0248697 A1 | 11/2006 | Schaefer | |
| 2016/0229014 A1 * | 8/2016 | Zimmermann | .... B23Q 11/0003 |

FOREIGN PATENT DOCUMENTS

| | | |
|---|---|---|
| JP | 2006-175527 A | 7/2006 |
| WO | 2013/094367 A1 | 6/2013 |

* cited by examiner

NUMERICALLY CONTROLLED MACHINE TOOL

The present invention relates to a numerically controlled machine tool, comprising a shaped element which protects in particular a machine bed of the machine tool against temperature fluctuations in the ambient temperature of the machine tool.

The prior art knows numerically controlled machine tools which are supported on a machine bed. The machine tools are closed to the outside by a machine cabin to protect the operators against chip material which flies around and can be slung away from the workpiece during the machining operation and against coolant which is splashed. At the same time, the cabin also protects against external influences, such as an air draft, which might distort the machining accuracy. However, a drawback of the conventional machine tools is still that temporary temperature fluctuations in the region of the machine tool can lead to thermal deformations, in particular of the machine bed of the machine tool. These often relatively small deformations can, however, critically reduce the machining accuracy of the machine tool.

An object of the present invention is to create a numerically controlled machine tool which is less sensitive to temperature fluctuations in the environment of the machine tool, thus offering a further improved machining accuracy.

The object is achieved by the invention according to the independent claim. Further preferred developments of the invention are described in the dependent claims.

According to a first aspect of the invention, a numerically controlled machine tool is proposed, comprising a machine bed which can be set up on a flat floor area (e.g. shop floor), a cabin supported by (or on) the machine bed and a shaped element which covers a lower portion of the machine bed, at least between the flat floor area and a cabin wall of the cabin, wherein the shaped element is mounted on the machine tool in such a way that a cavity is formed between the machine bed and the shaped element.

The invention makes it possible that a thermally insulating cavity can be formed by means of the shaped element, in particular about the lower part of the machine bed, said lower part being not protected by the cabin itself and being exposed to the outside in machine tools known in the prior art. The thermally insulating property of the cavity renders possible that in particular temporarily occurring temperature fluctuations in a machine shop, in which the machine tool according to the invention is set up, results in significantly reduced or no deformation of the machine bed. Such temperature fluctuations can occur e.g. in winter when gates of the machine shop have to be opened and temperature drops near the floor can occur extremely quickly. Since deformations of the machine bed, which are induced by temperature fluctuations, are prevented, the accuracy of the machining operation of the workpiece is therefore further increased or at least ensured to a greater extent.

The shaped element preferably extends substantially from the flat floor area to an upper portion of the machine bed, in particular preferably in such a way that an upper portion of the shaped element is arranged between the machine bed and a lower portion of the cabin. It is particularly preferred for the lower portion of the cabin to be in contact with the shaped element. Due to such a direct transition from shaped element and cabin, the machine bed is protected against short-term external temperature fluctuations or at least thermally insulated in the case of temperature fluctuations occurring for a short time.

The shaped element preferably covers the lower portion of the machine bed, at least along a front side of the machine bed, along two or more sides of the machine bed, or even the lower portion of the machine bed by embracing the entire circumference of the machine bed.

The shaped element is preferably made of metal and/or a plastic material.

The shaped element preferably comprises one or more extruded profiled sheets which are preferably adapted to an outer form of the machine bed.

The shaped element preferably has a surface coating made of a coating material which has a thermal conductivity that is below the thermal conductivity of the material of the shaped element. Therefore, the thermally insulating action of the cavity can be further improved. The surface coating is here preferably provided on a shaped element surface facing the cavity.

The shaped element is preferably attached to the machine bed by means of a plurality of attachment elements, in particular by means of screws or bolts, wherein the attachment elements preferably extend from the shaped element through the cavity to the machine bed. The attachment elements are here preferably made from a material which has a thermal conductivity that is below the thermal conductivity of the material of the shaped element. Therefore, the machine bed can be further improved and protected against external temperature fluctuations and/or temperature fluctuations of the temperature of the shaped element.

The shaped element preferably has recessed portions, as a result of which the distance from the shaped element to the machine bed varies, wherein the recessed portions are formed on a lower edge of the shaped element. This enables a user of the machine to get closer to the machine at the positions of the recessed portions since room can be made for the forefoot regions of the operator.

A rubber lip is preferably mounted along a lower edge of the shaped element and is suitable to seal a gap between the lower edge of the shaped element and a flat floor area. The advantage is that even in the case of minor flatness imperfections of the shop floor, the cavity is protected against the air or air drafts in the floor region of the workshop and the thermal protection or the thermal insulation of the machine bed can be further improved to the outside.

The machine bed preferably has machine bed feet which extend horizontally outwards and rest on the flat floor area, wherein the shaped element has recesses through which the machine bed feet extend.

Further advantageous aspects of the invention are described below. According to an exemplary embodiment, a numerically controlled machine tool can have a machine bed and a cabin having a cabin wall. The cabin wall can embrace at least part of the machine bed. Furthermore, the machine tool can have at least one shaped element which can have a substantially panel-shaped basic form. The shaped element can be fixed to the machine tool in such a way that a cavity can be formed between the shaped element and the cabin wall and/or the machine bed.

This renders possible in an advantageous way that a thermally insulating cavity can be created by means of the shaped element, in particular about the machine bed. The thermally insulating property of the cavity makes possible that, in particular temporarily occurring temperature fluctuations in a machine shop, in which the machine tool according to the invention is set up, result in a reduced or no deformation of the machine bed. Such temperature fluctuations can occur e.g. in winter when gates of the machine shop have to be opened. Since temperature fluctuationinduced deformations of the machine bed are prevented, the accuracy of the machining operation of the workpiece is further increased or at least ensured to a greater extent.

Furthermore, the shaped element can be arranged on a lower portion of the machine bed up to a predetermined height of the machine bed. The cavity can be arranged between the machine bed and the shaped element.

A lower portion of the machine bed preferably designates the region of the machine bed which is arranged in the direction of the shop floor on which the machine rests or the region by means of which the machine is set up. A preferred predetermined height is within the range of 1 cm to 50 cm, more preferably from 10 cm to 30 cm. Values greater than 50 cm or smaller than 1 cm are also possible. The predetermined height is preferably measured starting from the shop floor or the plane on which the machine bed or the machine tool itself rests.

Alternatively or additionally, the cabin can also fully embrace the bottom portion of the machine bed. Then, the shaped element can be mounted on an outer side and/or inner side of the cabin wall or the shaped element is attached to the machine bed inside the cabin wall, i.e. between cabin wall and machine bed.

In particular when the cavity is formed between the machine bed and the shaped element, temperature fluctuations can be prevented in a particularly effective fashion to directly result in deformations of the machine bed. This is useful in particular with respect to cool air flow masses in the region of the bottom portion. Temperature fluctuations which occur e.g. due to an open machine shop gate, are usually produced by cold air masses which flow near the floor. Therefore, the enclosure of a part or the entire bottom portion has the preferred effect that the machine bed is heat-insulated in a particularly good fashion in this region by means of the shaped element and/or the cavity.

The cabin can be arranged above the shaped element. The shaped element can be arranged between a shop floor and the cabin. In this case, the machine bed is protected against temperature fluctuations in a bottom portion by the shaped element and/or the cavity. The cabin wall does not have to extend in a complex design to the shop floor. The shaped element can cover only one side wall of the machine bed—in part or in full—or a plurality of side walls. Of course, the shaped element can also fully embrace the machine bed.

A segment of the shaped element can also be arranged between the cabin and the machine bed. This means that only the shaped element is provided in the lower portion of the machine bed and a cabin wall is arranged on the outer side in a portion of the machine bed or the machine tool, arranged above this lower portion. The shaped element is arranged in this upper portion between cabin wall and machine bed. The advantage is that a gap and/or opening can safely be avoided at the transition between shaped element and cabin wall.

Furthermore, the shaped element can be arranged at least on a side wall of the machine bed. The shaped element can additionally or alternatively cover at least a segment of a rear wall and/or at least a segment of at least one side wall of the cabin. The shaped element can fully embrace the machine bed.

The general rule is that an improved thermal insulation of the cabin interior can be achieved with respect to the cabin environment the more cavity volume is formed or the larger the surface area of the machine bed is that is covered by means of the shaped element. Therefore, it can be prevented in an even better way that temperature fluctuations of the cabin environment lead to temperature fluctuations in the cabin interior. This is desired in particular with respect to fluctuations which occur for a short time and result in a short-term deformation of the machine bed.

Furthermore, the shaped element can be adapted to a form of the cabin wall in such a way that the shaped element and the cabin wall and/or the machine bed form an externally closed cavity.

An externally closed cavity means that substantially no or only a small amount of air masses is exchanged between the cavity and the environment external to the cavity. This enables e.g. the formation of a constant air cushion in the cavity, thus effectively reducing a thermal flow through the cavity.

In addition, the cavity can be filled with air or can be evacuated. Furthermore, a material can be arranged inside the cavity and does not exceed a predetermined thermal conductivity. The air can be evacuated by means of a small pump.

As explained above, the air charge of the cavity, which is closed in particular to the outside, leads to a small heat transfer coefficient and thus a good thermal insulation. Another improvement with respect to the thermal insulation can be achieved by means of an evacuated cavity. The term "evacuated" here means that the cavity comprises a vacuum. A rough vacuum here already leads to a preferred reduction in the heat transfer coefficient.

Furthermore, the shaped element can consist of, or at least include, a metallic and/or a plastic material.

A metallic material is preferred with respect to a good ability to produce the shaped element, in particular in operating steps which are not very complex, such as metal bending, etc. A plastic material can also be processed with respect to the desired shaping and has the further advantage that the thermal conductivity of plastics is usually comparatively low. Therefore, the heat insulating properties of the shaped element can be further supported.

In addition, the shaped element can be an extruded profiled sheet which can be adapted to an outer form of the cabin of the machine tool by means of bending. Additionally or alternatively, the shaped element can be made from a plurality of individual elements.

This flexibility with respect to the manufacturing techniques allows in particular the shaped element to be adaptable to substantially any outer form of a machine tool or the cabin wall or the machine bed without any additional, complex manufacturing effort.

Furthermore, the shaped element can preferably have a coating on a surface which can be arranged inside the cavity. The coating can include a material having a thermal conductivity which can be below a predetermined maximum thermal conductivity.

Thus, an additional thermal barrier is provided, which further reduces the heat flow through the shaped element and the resulting cavity. A predetermined maximum thermal conductivity in W/mK is here preferably less than 3 and a predetermined maximum thermal conductivity in W/mK is more preferably less than 1. For example, plastic materials are preferred as a material for the coating.

Furthermore, the shaped element can be detached from the machine tool and/or fixedly attached thereto by means of a positive and/or frictional connection. The shaped element can preferably be connected to the machine bed. In order to attach the shaped element, it is preferred to use at least one bolt.

This enables the not very complex and fast attachment of the shaped element, e.g. by means of a screw connection or a snap-in connection, to the machine tool and at the same time a rapid detachment, e.g. in the case of necessary maintenance work on the machine tool. A bolt, in turn, enables a permanent secure fixation which is not very complicated.

Furthermore, the shaped element has recessed portions, as a result of which the distance of the shaped element to the machine bed along a longitudinal direction of the shaped element can vary when it is mounted on the machine bed.

This means that when the shaped element covers e.g. a front side of the machine bed, the front side comprises portions in which the shaped element is arranged closer to the machine bed than in other portions. This is advantageous in particular in the work area of the machine tool since an operator of the machine tool must be able to get as close as possible to the machine in this work area. When in this area the shaped element abuts closer to the machine bed, the operator is not hindered by the shaped element.

Furthermore, a portion of the shaped element, which can be aligned in relation to the shop floor, can have a rubber lip. The advantage is that it is even possible to compensate for flatness imperfections of the shop floor and to ensure an optimum abutment of the shaped element on the shop floor. Thus, gaps or openings between shop floor and shaped element are safely prevented, thus enabling an optimum insulating effect of the shaped element and/or the cavity.

Furthermore, the shaped element can have recesses, e.g. to receive machine bed feet therein. This serves to ensure both a safe set-up of the machine tool on feet and an optimum insulating effect by the shaped element.

In summary, the invention thus renders possible that a machine tool is further improved, in particular with respect to the achievable manufacturing accuracies by reducing a sensitivity to temperature fluctuations and thus induced deformations, in particular of the machine bed.

Figure 2:
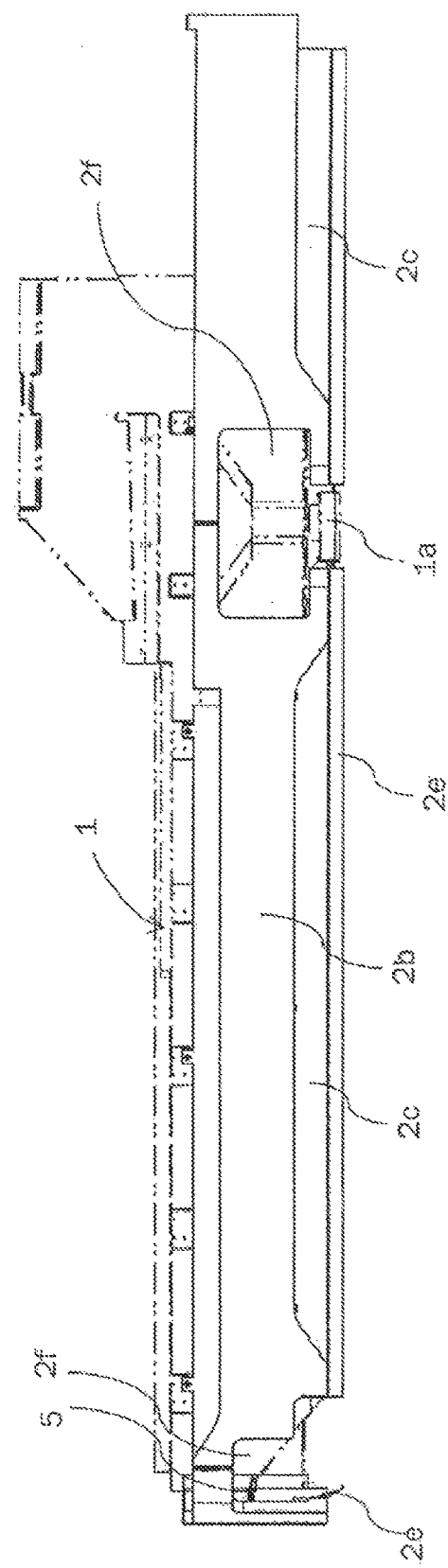
Figure 3:
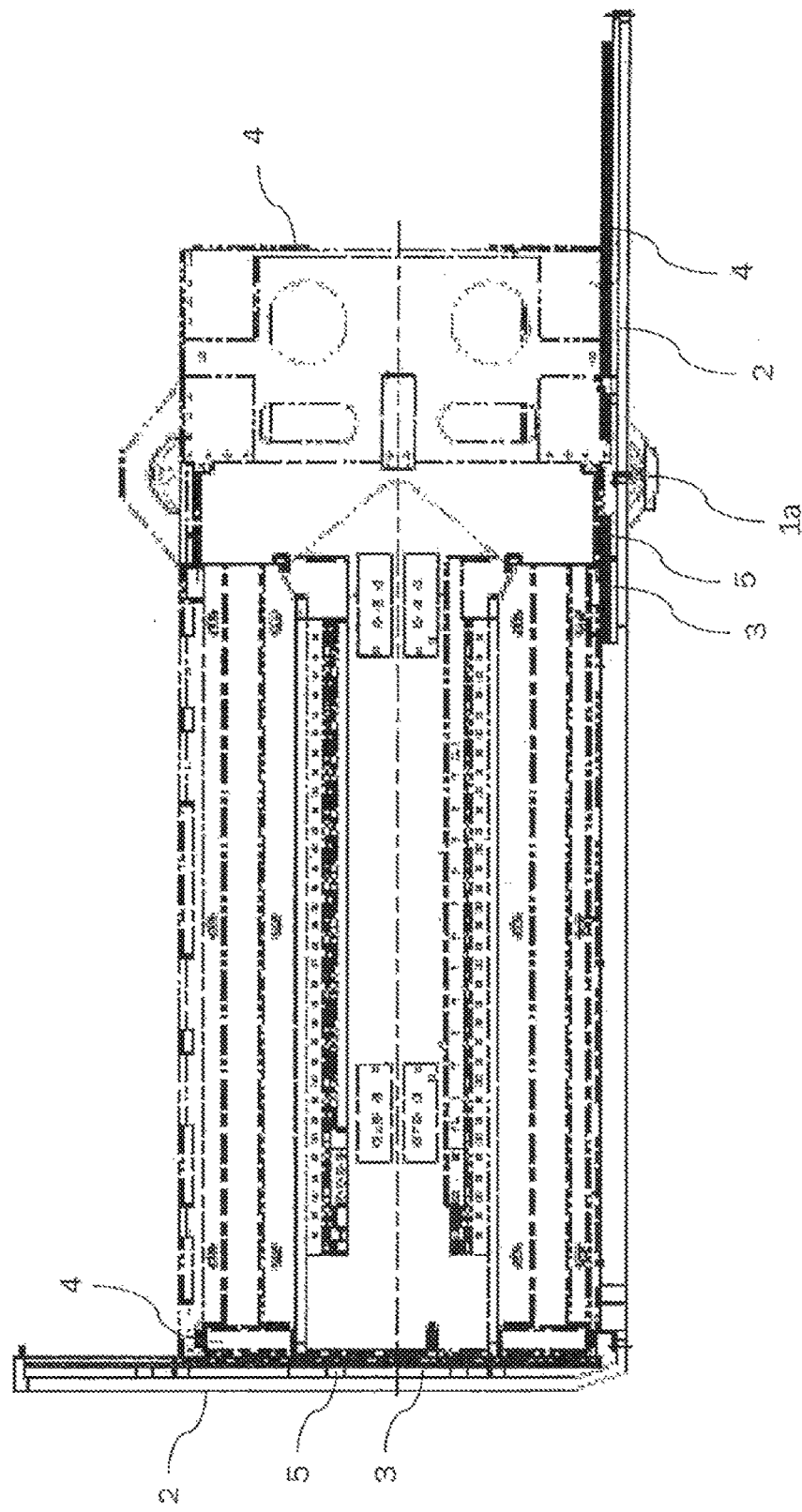
Figure 4:
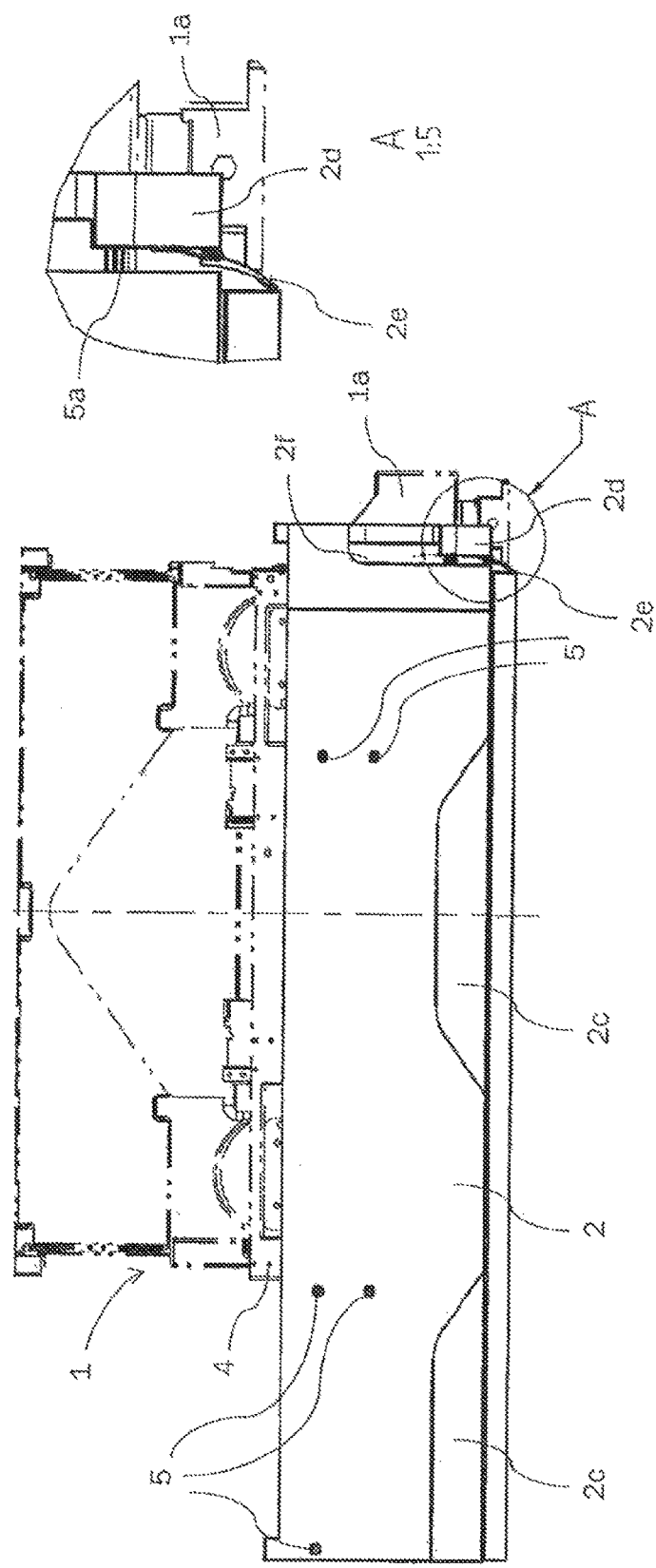

The invention is described below by way of example with respect to the enclosed, diagrammatic drawings, wherein FIG. 1 shows two 3D views of the shaped element according to the invention, FIG. 2 shows a side view of the shaped element which is arranged on a machine bed of a machine tool, FIG. 3 shows a top view of the shaped element which is attached to a machine bed of a machine tool, and FIG. 4 shows a further side view of the shaped element according to the invention, which is arranged on a machine bed, and an enlarged segment.

Various examples of the present invention are detailed below with reference to the drawings. Equal or similar elements in the drawings are here designated by equal reference signs. However, the present invention is not confined to the described implementing features but additionally comprises modifications of features of the described examples and combination of features of different examples within the scope of the independent claims.

FIG. 1 shows two perspective views of the shaped element 2 according to the invention, which is used as a heat shield for a better thermal insulation of a numerically controlled machine tool. The illustrated shaped element 2 comprises two panel-shaped elements 2a and 2b, which are arranged in L-shaped fashion with respect to each other. The two elements 2a, 2b are fixedly connected to each other via the corner point of the L-shape. Alternatively, the shaped element 2 can also be made of one piece. The L-shape renders possible so assign the longer element 2b to a front side of a machine bed 1. The shorter element 2a can be arranged in front of a side wall of the machine bed 1.

As follows from the two representations in FIG. 1, the shaped element 2 has two larger recesses 2f, which are arranged in such a way that the recesses 2f can accommodate the machine bed feet 1a. Furthermore, the two representations of the shaped element 2 show that the shorter element 2a of the shaped element 2 has recessed portions 2c which are provided in a lower portion of the shaped element 2 which is arranged in the direction of a shop floor when the shaped element 2 is assembled. When the shaped element 2 is mounted on a machine bed 1 or the side wall 4 of a machine bed 1, the recessed portions 2c reduce the distance between the side wall 4 and an inner wall of the shaped element 2. This is advantageous in particular with respect to the fact that the recessed portions 2c prevent the shaped element 2 from being an impediment to an operator when he operates the machine tool. In concrete terms, these recessed portions 2c can receive the feet of an operator, as a result of which the operator can get very close to the machine tool.

Furthermore, the individual element 2a is provided with receiving portions which receive a bolt 5a for forming a positive and/or frictional connection 5 to the machine bed 1. Furthermore, FIG. 1 shows that end regions 2g of the shaped element 2 have a form which is adapted in such a way that the shaped element can be attached to the machine bed 1 as accurately as possible as regards the form. For example, the two end regions 2g have angled regions which permit e.g. that the shaped element 2 meshes as precisely as possible with a cabin wall of the machine tool.

Furthermore, the right-hand representation of FIG. 1 discloses that the region of an inner wall of the shaped element 2 is provided with reinforcements which ensure a better structural strength of the shaped element 2.

Furthermore, FIG. 2 shows the shaped element 2 in a state mounted on the machine bed 1. The side view of FIG. 2 shows the part of the shaped element 2, which is designated by 2b in FIG. 1. In its assembled state, the shaped element 2 shown covers at least the lower portion of the machine bed 1 in its entirety, wherein the foot 1a of the machine bed 1 is inserted in the recess 2f in a precisely fitting way. Optionally existing gaps between the foot 1a and edges of the recess 2f can be fully closed by means of a sealant.

Furthermore, FIG. 2 shows the arrangement of the recessed portions 2c, which are arranged in a lower portion for the shaped element 2. A rubber lip 2e is arranged below the lower portion. The rubber lip 2e makes it possible that the shaped element 2 terminates with the shop floor on which the machine tool rests in a way as precisely fitting as possible. Therefore, the cavity 3 between the shaped element 2 and the side wall 4 of the machine bed 1 is protected as good as possible against a cold draft, for example. This enables an optimum thermal insulation of the machine bed 1 also with respect to temporary temperature fluctuations in a workshop in which the machine tool is set up. The rubber lip 2e extends substantially along the entire length of the shaped element 2 but can be interrupted in the region of the machine bed foot 1a, as shown in FIG. 2.

Furthermore, FIG. 2 shows in detailed fashion the form of the recesses 2f of the shaped element 2. A first recess 2f, in which the machine bed foot 1a of FIG. 2 is shown, has a substantially rectangular region which is adjoined below by a channel-like portion. The region of the channel-like portion accommodates the part of the machine bed foot 1a which rests on the shop floor. Another recess 2f, which is arranged in an edge region of the shaped element 2, has a substantially step-like shape.

FIG. 3 shows a top view of the shaped element 2, which is fixedly connected to the connection 5 by means of the machine bed 1. The connection 5 is preferably made of bolts 5a, which retain the shaped element 2 at least at one side wall 4 of the machine bed 1. The representation in FIG. 3 shows that at least two side walls 4 of the machine bed 1 are covered by the shaped element 2 on account of the L-shape of the two individual elements 2a, 2b of the shaped element 2, as a result of which a cavity 3 is formed between an inner wall of the shaped element 2 and said two side walls 4 of the machine bed 1. This cavity 3 can be filled with air or can also be partly evacuated.

FIG. 4 shows another side view, namely of the individual element 2a according to FIG. 1, which is attached to a top end of the machine bed 1 by means of the connection means 5. The portion of the shaped element 2, which is marked by "A", is also shown in FIG. 4 in an enlarged partial view "A". The partial view shows the attachment of the shaped element 2 by means of a bolt 5a, and the arrangement of the machine bed foot 1a in recess 2f. In addition, a lower portion 2d of the shaped element 2 is shown on which the rubber lip 2e is arranged. As shown and in particular disclosed in partial view "A", the rubber lip 2e is connected in flat fashion e.g. by means of an adhesive bond to the portion 2d of the shaped element 2.

Finally, it is summarized that the shaped element 2, which is used as a heat shield, protects in particular the machine bed 1 of a machine tool in a better way against short-term temperature fluctuations in the set-up region of the machine tool, thus reducing or preventing short-term deformations of the machine bed 1, which would lower the manufacturing quality.

The invention claimed is:

1. A numerically controlled machine tool, comprising
a machine bed which can be set up on a flat floor area,
a cabin supported by the machine bed, and
a shaped element, which covers a lower portion of the machine bed, at least between the flat floor area and a cabin wall of the cabin,
   wherein the shaped element is mounted on the machine tool in such a way that a cavity is formed between the machine bed and the shaped element,
   wherein the shaped element has recessed portions, as a result of which a distance of the shaped element in relation to the machine bed varies, and
   wherein the recessed portions are formed on a lower edge of the shaped element, the recessed portions being formed at a size suitable for receiving feet of an operator of the machine.

2. The machine tool according to claim 1, wherein
the shaped element extends substantially from the flat floor area to an upper portion of the machine bed in such a way that an upper portion of the shaped element is arranged between the machine bed and a lower portion of the cabin.

3. The machine tool according to claim 2, wherein the lower portion of the cabin is in contact with the shaped element.

4. The machine tool according to claim 1, wherein
the shaped element covers the lower portion of the machine bed, at least along a front side of the machine bed.

5. The machine tool according to claim 1, wherein
the shaped element covers the lower portion of the machine bed along two or more sides of the machine bed.

6. The machine tool according to claim 1, wherein
the shaped element covers the lower portion of the machine bed so as to fully embrace the machine bed.

7. The machine tool according to claim 1, wherein
the shaped element is made of metal and/or a plastic material.

8. The machine tool according to claim 1, wherein
the shaped element comprises one or more extruded profiled sheets, which are adapted to an outer form of the machine bed.

9. The machine tool according to claim 1, wherein
the shaped element has a surface coating made from a coating material which has a thermal conductivity that is below the thermal conductivity of the material of the shaped element.

10. The machine tool according to claim 9, wherein
the surface coating is provided on a surface of the shaped element, which faces the cavity.

11. The machine tool according to claim 1, wherein
the shaped element is attached to the machine bed by means of a plurality of attachment elements, wherein the attachment elements extend from the shaped element through the cavity to the machine bed.

12. The machine tool according to claim 11, wherein
the attachment elements are made from a material which has a thermal conductivity that is below the thermal conductivity of the material of the shaped element.

13. The machine tool according to claim 1, wherein
a rubber lip is attached along a lower edge of the shaped element and is adapted to seal a gap between the lower edge of the shaped element and a flat floor area.

14. The machine tool according to claim 1, wherein
the machine bed has machine bed feet which extend horizontally outwards and serve to rest on the flat floor area, wherein the shaped element has recesses, through which the machine bed feet extend.

* * * * *